(12) United States Patent
Lukyanenko et al.

(10) Patent No.: US 12,072,919 B2
(45) Date of Patent: Aug. 27, 2024

(54) SENTENCE LEVEL DIALOGUE SUMMARIES USING UNSUPERVISED MACHINE LEARNING FOR KEYWORD SELECTION AND SCORING

(71) Applicant: PAYPAL, INC., San Jose, CA (US)

(72) Inventors: Nikita Alekseyevich Lukyanenko, San Jose, CA (US); Alexander Shvid, Las Vegas, NV (US)

(73) Assignee: PAYPAL, INC., San Jose, CA (US)

( * ) Notice: Subject to any disclaimer, the term of this patent is extended or adjusted under 35 U.S.C. 154(b) by 255 days.

(21) Appl. No.: 17/463,303

(22) Filed: Aug. 31, 2021

(65) Prior Publication Data

US 2023/0063713 A1    Mar. 2, 2023

(51) Int. Cl.
  *G06F 16/30* (2019.01)
  *G06F 16/34* (2019.01)
  *H04L 51/02* (2022.01)
  *H04L 51/046* (2022.01)

(52) U.S. Cl.
  CPC ............ *G06F 16/345* (2019.01); *H04L 51/02* (2013.01); *H04L 51/046* (2013.01)

(58) Field of Classification Search
  CPC ...... G06F 16/345; G06F 40/279; G06F 40/35; H04L 51/02; H04L 51/046
  See application file for complete search history.

(56) References Cited

U.S. PATENT DOCUMENTS

| | | | | |
|---|---|---|---|---|
| 11,095,579 B1 * | 8/2021 | de Mazancourt | ....... | G06F 40/40 |
| 11,263,407 B1 * | 3/2022 | Jawale | .................. | G06F 40/166 |
| 11,640,493 B1 * | 5/2023 | Park | .................... | G06F 16/9024 |
| | | | | 715/254 |
| 11,721,093 B2 * | 8/2023 | Liu | ........................ | H04L 51/216 |
| | | | | 707/734 |
| 2007/0130257 A1 * | 6/2007 | Bedi | .................... | G06Q 10/107 |
| | | | | 709/204 |

(Continued)

OTHER PUBLICATIONS

Article entitled "An Extractive Chat Summary Generation Method for Ecommerce Chatbots", by Han et al., dated 2020 (Year: 2020).*

(Continued)

*Primary Examiner* — Mahesh H Dwivedi
(74) *Attorney, Agent, or Firm* — Haynes and Boone, LLP

(57) ABSTRACT

There are provided systems and methods for sentence level dialogue summaries using unsupervised machine learning for keyword selection and scoring. A service provider, such as an electronic transaction processor for digital transactions, may provide live chat service channels for assistance through live agents and chatbot services. When interacting with these channels over a period of time, a user may create a dialogue with multiple different live agents and/or chatbots. These chat sessions may be asynchronous but have important and relevant information for future live agents to review. Thus, the service provider may provide a dialogue summarizer, which may summarize a dialogue automatically to a number of most relevant sentences. This may be done using an unsupervised machine learning system that utilizes different machine learning algorithms to select and rank keywords within the sentences. The sentences are then scored and highest scored sentences are output as a summary.

20 Claims, 6 Drawing Sheets

(56) References Cited

U.S. PATENT DOCUMENTS

| | | | |
|---|---|---|---|
| 2010/0204981 A1 | 8/2010 | Ribeiro et al. | |
| 2011/0078105 A1 | 3/2011 | Wallace | |
| 2013/0325478 A1 | 12/2013 | Matsumoto et al. | |
| 2015/0066479 A1 | 3/2015 | Pasupalak et al. | |
| 2015/0302083 A1* | 10/2015 | Simske | G06F 16/345 707/750 |
| 2016/0147387 A1* | 5/2016 | Rahman | G06F 40/258 715/752 |
| 2016/0300570 A1 | 10/2016 | Gustafson et al. | |
| 2017/0161372 A1* | 6/2017 | Fernández | G06F 40/211 |
| 2019/0327103 A1* | 10/2019 | Niekrasz | G10L 15/26 |
| 2019/0349321 A1* | 11/2019 | Cai | G06N 3/006 |
| 2020/0357408 A1* | 11/2020 | Boekweg | G10L 15/26 |
| 2021/0192126 A1* | 6/2021 | Gehrmann | G06N 20/00 |
| 2022/0030110 A1* | 1/2022 | Khafizov | H04M 3/2218 |
| 2022/0272054 A1* | 8/2022 | Gao | G06F 40/284 |
| 2022/0309231 A1* | 9/2022 | Yoon | G06F 40/35 |

OTHER PUBLICATIONS

Article entitled "Company-Oriented Extractive Summarization of Financial News", by Filippova et al., dated Apr. 3, 2009 (Year: 2009).*

Article entitled "An Approach for Ex-Post-Facto Analysis of Knowledge Graph-Driven Chatbots—The DBpedia Chatbot", by Jalota et al., dated 2020 (Year: 2020).*

Article entitled "Intelligence in Wikipedia", by Weld et al., dated 2008 (Year: 2008).*

Article entitled "Improving Deposition Summarization using Enhanced Generation and Extraction of Entities and Keywords", Sumant , dated Jun. 1, 2021 (Year: 2021).*

International Search Report and Written Opinion for Application No. PCT/US2022/40476 mailed on Dec. 19, 2022, 15 pages.

* cited by examiner

Chat Summary Window 202

Summary — 204
This summary is a prediction of the most relevant messages sent by the customer Feb 11, 2021 09:30AM —208a  [MOST RELEVANT]
The advisor told me that after days the funds would be released so why aren't they
Is this sentence accurate? [Yes] [No] —210a Feb 11, 2021 09:29 AM —208b
TransactionText: ABCD1234|£41.95|FEB 05, 20|21
Is this sentence accurate? [Yes] [No] —210b Feb 11, 2021 09:29 AM —208c
Please tell me how to get these funds released as this was a duplicate payment but only one order was placed
Is this sentence accurate? [Yes] [No] —210c Feb 11, 2021 09:28 AM —208d
I was advised that these funds would be available after 5 days as this was an error.
Is this sentence accurate? [Yes] [No] —210d Feb 11, 2021 09:26 AM —208e
I was advised that the funds would be available after 5 days
Is this sentence accurate? [Yes] [No] —210e

Details — 206
Recommended information is account information found in the conversation with your customer Transaction ID —212    View Money amounts —214    Copy
41.95

Dates —216    Copy
FEB 05, 2021

Tracking Numbers —218
No data available

Dispute ID —220
No data available

Is this information helpful?  [Yes] [No] —222

Conversation A: — 302                                                            300a 304
- Agent- "Hello, thank you for contacting PayPal chat support. My name is Nathan. I am happy to assist you TODAY DATE"
- Customer- ACCIDENTALLY DECLINED my BUYERS PAYMENT, what can I do to fix this
- Agent- SHERRIE ORG, I do understand that if buyer is unable to send the PAYMENT then the issue might be from theiR end.
- Customer- She SENT the PAYMENT and I HIT WRONG BUTTON HIT
- Customer- It SAID she PAID but I HIT something now it SAYS DENIED
- Agent- I am very sorry to hear that.
- Agent: What is the date and amount of the transaction or the transaction ID?
- Customer- It was JULY29TH DATE for 23.00 DOLLARS MONEY to PERSON A
- Agent- I can show that you have DENIED this request.
- Agent- You request the money again so that he can pay you.

308 Conversation B: — 306

- Customer - Yes i HIT WRONG BUTTON. I am new at this.
- Agent - Yes, I do agree with you. However, you cannot undo what is already done. It will be refunded back to the CARD.
- Customer - OH ok, so if I ask her to pay again will it DOUBLE the AMOUNT off her CARD
- Agent - Its already credited back to them. It will reflect in their CARD within 5 BUSINESS DAYS DAYS
- Customer - So how do i do this again
- Agent- No, it won't if she wants she can contact us directly and we will inform the same to her so that she can make the PAYMENT again.
- Customer - Okay thank you so much
- Agent - Okay thank you so much
- Agent - You are welcome. Is there anything else I can help you with?
- Customer - Does she call a number Keyword generation: — 310
- accidentally declined
- amt
- button
- buyers payment
- card
- dollars
- double amt card
- hit wrong button
- payment
- payment said
- said paid
- says denied ir
- sent payment
- teresa hardy yes

SENTENCE LEVEL DIALOGUE SUMMARIES USING UNSUPERVISED MACHINE LEARNING FOR KEYWORD SELECTION AND SCORING

TECHNICAL FIELD

The present application generally relates to intelligent and automated generation of dialogue summaries and more particularly to utilizing a combination of machine learning models to extract keywords from dialogues to score sentences in the dialogues for intelligent presentation of dialogue summaries.

BACKGROUND

Service providers may have large computing systems and services that provide automated and live agent chat interfaces and interactions with different end users, such as customers, clients, internal users and teams, and the like. For example, a service provider's computing system may have multiple different divisions and corresponding systems for data processing, storage, and use. However, when different users are utilizing the computing services and operations provided by the service provider, these users may require assistance and/or information, such as when using a user's digital account to perform electronic transaction processing through an online electronic transaction processor. When this occurs, users may interact with live agents and chatbots via a live chat service and platform. These live chat services may include live agent messaging and chat, automated assistance channels with chatbots, asynchronous chat services, and the like, which may also be accessed through text messaging, emails, push notifications, instant messaging, and other electronic communication channels. However, when the live agents and/or chatbots converse with customers or other end users over a period of time, such as in asynchronous chat sessions that may occur at different times, different live agents may provide service to the users. This requires internal teams of the service provider to separately review previous chat sessions and quickly become familiar with the chat session in order to provide adequate support without requiring the user to repeat previously provided information.

BRIEF DESCRIPTION OF THE DRAWINGS

FIG. 2 is an exemplary user interface displaying a summary of a chat dialogue from a live chat service based on keyword extraction and sentence scoring using unsupervised machine learning models, according to an embodiment;

FIG. 3A-3B are exemplary diagrams of a chat dialogue having extracted keywords using unsupervised machine learning models that are used to determine a summary of the chat dialogue, according to an embodiment;

Figure 1:
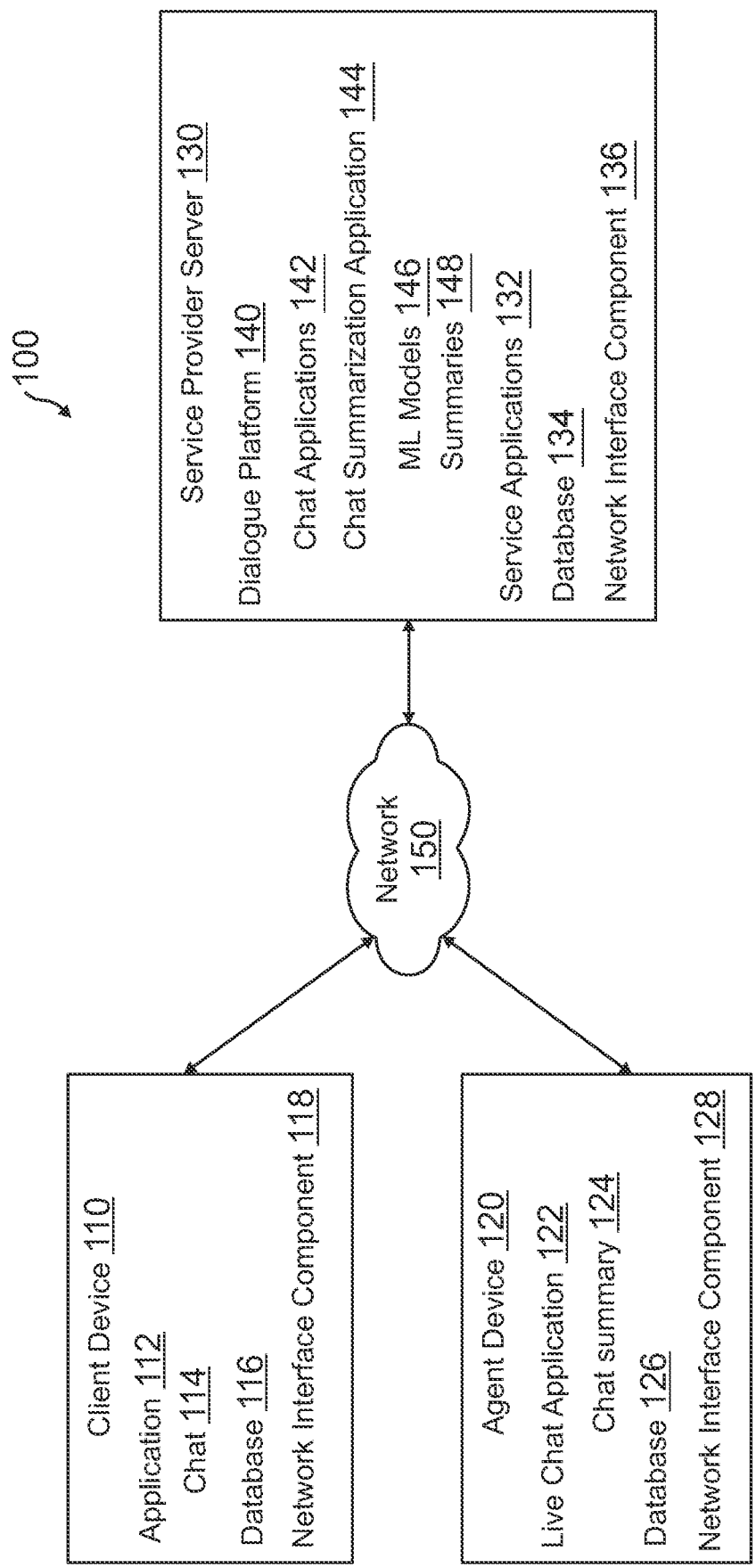
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for sentence level dialogue summaries using unsupervised machine learning for keyword selection and scoring. Systems suitable for practicing methods of the present disclosure are also provided.

In computing systems of service providers, live chat services via chat platforms may include live agents and chatbots for automated help or assistance. The live chat services may be provided via online digital platforms for customer relationship management (CRM) systems that provide assistance, reporting, sales, and the like. In this regard, CRM systems may provide live chat services through dialogues conducted via an email channel, a digital alert channel, a text message channel, a push notification channel, an instant message channel, or other messaging channel. However, other dialogues may also occur asynchronously and without live communications, such as with delayed email communications. Thus, dialogues between users (e.g., customers including merchants and individual users or buyers with an online transaction processor) and live agents or chatbots (e.g., automated computing processes for responding to user requests and conversation) may allow for users of a service provider to engage in assistance options associated with one or more services of the service provider. For example, an online transaction processor may provide live chat assistance for account setup, authentication, account usage (e.g., during electronic transaction processing), mobile device or application usage, payment information and/or service, and the like.

When providing these chat services, dialogues, such as chats, conversations, messages, and other communications may occur over different sessions and/or time periods, and asynchronous chat sessions may cause different live agents and/or chatbots to provide assistance to users. Some dialogues may be long, and review may take substantial time for live agents to read and determine previous issues, questions and queries, provided data and the like. Thus, the service provider may provide a dialogue summarization pipeline to provide a summary of a dialogue by determining a number of most relevant or highest likelihood of interest sentences from the dialogue to present to a live agent. This may be determined using an unsupervised machine learning (ML) model combination to identify and rank keywords. Thereafter, each sentence may be scored using the keywords and the corresponding rankings. Once scored, the sentences may be ordered according to scores, and a number of the sentences scoring the highest may be selected for use as a summary of the dialogue. The summary of the dialogue may also be provided with named entity recognition (NER) and/or regular expression (regex) processing to enrich the summary by providing details with additional key information next to the summary and/or within the sentence of the summary.

In this regard, a service provider that may provide services to users including electronic transaction processing, such as online transaction processors (e.g., PayPal®), may allow merchants, users, and other entities to process transactions, provide payments, transfer funds, or otherwise engage in computing services. For example, in other embodiments, other service providers may also or instead provide computing services for social networking, microblogging, media sharing, messaging, business and consumer platforms, etc. In order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate and/or process data, which may encounter issues or require users to request help or assistance. In order to provide widely available assistance options, the service provider may therefore wish to provide different live chat services and platforms through different electronic communication channels. When engaging in assistance options and other live chat services, dialogues may be generated, which may correspond to the chat, conversation, messaging, and other exchanged dialogue between a user of the service provider and a live agent or chatbot assisting the user during a communication session. These communication sessions may be asynchronous, and thus, the service provider may require automated summarization of dialogues generated via these live chat services in order to reduce time, data processing resources, and application usage required for individual and manual generation of dialogue summaries.

The service provider may provide an internal automated dialogue summarization engine that utilizes a ML model pipeline to perform sentence scoring and selection for a summary of a dialogue. A dialogue may correspond to a collection of sentences or other groupings of words, where the words in sentences may be broken into individual words, phrases, and/or specific groups of words (e.g., for names, items, places, etc.). In some embodiments, the dialogue may be limited to a number or past time period (e.g., a certain amount of time in the past, such as the last day, week, month, year, etc.) so as to limit the amount of asynchronous chat sessions in the dialogue. The summary may include N number of sentences based on keyword level selection and ranking, a system configuration, scoring of sentences from the dialogue using keywords, and/or a length of the dialogue. In this regard, the ML model pipeline may initiate by executing a pre-processing and filtering process to pre-process the dialogue for keyword selection and ranking, as well as filter specific words, groups of words, and sentences that may be of little relevance or cause performance issues in ML model processing. The pre-processing may include general text cleansing, such as to remove artifacts and unwanted characters and/or words, encoding, sentence and word or groups of word identification using tokenization and punctuation (e.g., capitalization and punctuation marks), spelling and grammar correction, and the like.

When filtering, chatbot utterances may be filtered partially or completely, such as those that do not add information of value. This may include "small talk" greetings by chatbots, such as "Hello!", "How are you?", "Thank you for contacting us!", and the like. The small talk may also include other responses made by the chatbot or automation tool, such as "Thank you for the information", "I am well, how can I help you?", and the like. Further, filtering may include filtering out information noise that does not bring value, which may utilize an intent prediction model. This may include filtering messages for greetings and/or approvals (e.g., those by live agents that may be recognized using intent prediction), filtering salutations, and/or other possible informational noise. Thus, when filtering the conversation in the dialogue, the dialogue may be split based on messages and the predicted intent of each message. Those messages that merely include a greeting, agreement, or the like may be filtered as those messages may be considered to not add value to the dialogue. Once filtered, the dialogue may be merged into a large text where spelling and punctuation is checked.

Using the filtered dialogue and corresponding sentences, the ML model pipeline may then implement a combination of ML model algorithms to perform keyword level selection and/or extraction from the sentences. The keyword level selection by the ML models seeks to identify keywords, such as words of importance that may be specifically targeted for an issue, repeated, identifying a specific issue or entity, and/or providing relevant or important data. In this regard, the ML model pipeline may be unsupervised in that the ML model pipeline may utilize a combination of ML model algorithms that does not require training and/or tuning and therefore the ML model pipeline may be considered unsupervised. Thus, the ML model pipeline may be copied and/or transported for use with different service providers, merchants, companies, and/or organizations and the ML model pipeline may work "out of the box" (OOTB) as a plug and play solution.

In order to provide for generation of keywords and their rankings, initially the ML model algorithm utilized may correspond to a Rapid Automatic Keyword Extraction (RAKE) ML model algorithm that performs keyword extraction on groups of words, sentences, documents, and/or a corpus of documents. The RAKE algorithm may correspond to a ML technique to extract keywords based on the words that contain multiple words with standard punctuation or stop words (e.g., those words with little lexical meaning and therefore are typically dropped during the pre-processing and filtering). Thereafter, a term frequency—inverse document frequency (TF-IDF) algorithm and technique may be applied. With TF-IDF, importance of a word to a document may be determined (e.g., importance, and therefore ranking, of keywords may be determined). With TF-IDF, a value of a keyword may increase in importance proportionally to how often that keyword appears in a dialogue. However, where the dialogue may be a corpus of documents (e.g., many individual chat dialogues from different chat sessions), the number of documents in the corpus may be used to offset the value of the keyword, such as when certain keywords may appear more often in general in dialogues. Thus, the value determined using TF-IDF may correspond to a statistical measure of an importance of a keyword to the dialogue.

The ML model pipeline may then apply a TextRank algorithm and technique that may be used to filter repeated information in the sentences and/or dialogue. For example, TextRank may correspond to a graph-based ranking model, which may process sentences and text to determine sentences or other groups of words of importance and keywords in the text. In this regard, TextRank may combine text from a dialogue, split up the sentences or other groups of words, generate vector representations of the sentences (e.g., using word embeddings), generate similarity scores or other similarities between sentence vectors, store those similarities in a matrix and convert the matrix to a graph, and then rank sentences based on sentences as vertices and similarity scores as edges between vertices. This allows for output of a number of highest-scored or ranked sentences. Finally, the ML model pipeline may apply a noun phrase extraction algorithm and technique. With noun phrase extraction, particular nouns are identified, and may be combined with nearby parts of speech to identify individual nouns and/or phrases with nouns. This allows for determining relevance of particular keywords in a dialogue based on parts of speech, so that keywords and keyword rankings (e.g., a score, value, or the like) may be determined.

Once the keywords and their corresponding rankings are determined, the ML model pipeline may proceed to score the individual sentences or other groups of words. Once the keywords are retrieved using the unsupervised ML model and corresponding ML algorithms, pre-processing and/or filtering may further be applied by removing all or specific messages by the live agent or chatbot from the dialogue. In this regard, it may be considered that the most important messages for a summary of a dialogue may correspond to those by the user in the dialogue, and not by a live agent or chatbot. Thus, a live agent may be most concerned with what a user previously stated or asked. However, this may not necessarily be the case and filtering of such sentences may be tuned by an administrator, live agent, and/or data scientist. Thereafter, the keywords are identified in text of the dialogue, such as in the different groups of words and/or sentences. Thereafter, the summarization engine of the service provider for the live chat service and platform may calculate a number of keywords in each group of words and/or sentences. In some embodiments, a combined score for the keywords in each group of words and/or sentences based on the keyword rankings for the keywords (e.g., a score, number, amount, or other ranking value) may also be used to score the sentences. The sentences may then be sorted in descending order based on score, and N number of sentences may be selected as the top or highest scored. N may be set and/or tuned by an administrator, the live agent requesting the summary, and/or a data scientist. For example, five sentences may initially be set for performance and length, but N may be adjusted for a number of preferable sentences to review. In some embodiments, the sorted list of sentences may further be adjusted based on rankings or scores attached to keywords.

Post-processing and further filtering may also be applied in order to further refine the sentences and/or summary generation for a dialogue. An entailment filter may function to filter out certain sentences with an entailment score at or below a certain threshold score, where the entailment score may be based on whether groups of words or sentences have a similar meaning or premise to a particular sentence or hypothesis sentence. For example, in natural language entailment filter, if one phrase and/or keyword set entails another one, then one of those may be dropped. Sentence Bidirectional Encoder Representations from Transformers (BERT) and cosine similarity may be applied where words that are similar to their sentences receive boosted scores and if words/sentences are too similar, duplicates may be dropped. A post-processor of the summarization engine may then perform identification and processing of parts-of-speech tags, as well as perform NER for named entities (e.g., transaction identifiers, dates, amounts, persons, organizations, addresses, etc.) in the dialogue and/or highest scored sentences. NER allows for named entities to be identified, highlights, and/or provided with an option to view additional information of the named entities. Thus, by utilizing post-processing with NER and/or regex for tagging and highlighting of important parts of speech and key information, the summary may be enriched with additional data that may assist an agent in properly handling a call based on previous asynchronous conversations between the user and the service provider's CRM or other chat assistance system. This may include providing information in the summary of transaction identifiers, transaction dates or other important dates, amounts or sums of funds that have been paid or transferred, and the like.

Thereafter, a summary for a dialogue may be generated with the sentences based on the N highest scored sentences. The summary may select the N sentences, and provide in a user interface, window, selectable drop down or expandable menu, pop-up, or the like. When selecting sentences, utterances determined based on intents may be split so that if the messages have X sentences, the dialogue may be shrunk and split. Thereafter, feedback associated with one or more of the sentences in the dialogue may be checked from one or more databases so that if there are any disliked sentences, scoring may be adjusted. Similarly, if certain keywords were part of a liked summary, that may be used to boost or increase sentence scoring, and vice versa. Sentences are then ranked by a number of keywords and their corresponding scores in the sentences. Thus, N top sentences may be returned with such scores and sentences ranked in chronological order. Score ranking may be used based on agent preferences, however, chronological order may be the default selection based on ease of viewing by an agent and/or coordination with the order sentences were stated chronologically during the dialogue.

Thus, the summary may be presented with the dialogue and/or in relation to a further communication session with the corresponding user. A live agent may therefore view the summary in the same or similar user interface or window for a further live chat session with the corresponding user. The sentences may be sorted for the summary in order in which they occurred in the original conversation, chat, or dialogue (e.g., based on date or timestamp, from oldest to newest), or may be stored by highest to lowest scored so that most important sentences may be viewed first. Further, a score for each sentence may be presented, which allows the live agent to view the relevance of each sentence. The summary may also include the enriched information, such as the NER of named entities in the dialogue's sentences for the summary and/or part of speech tagging. The summary may be presented every time that a new or returning agent joins the chat or on command/request by the new or returning agent.

The live agent may further provide feedback of whether sentences were relevant or not relevant and helpful in the dialogue. Based on the feedback, the summarization engine may either re-rank keywords, re-score sentences, and/or remove irrelevant sentences from the scored sentences, which allows the summary of the dialogue to be recreated in the user interface or window of presented to the agent. A database may further be provided to cache and/or store old summaries and provide again to one or more agents if needed. Further, the database may store the feedback from the agent(s), which may be used to train new models and/or when generating new summaries (e.g., to check if the dialogue had feedback and modify accordingly). The database may further store data on whether similar sentences were selected by an agent and keywords from those sentences of positive/negative feedback. This allows for a growing database of words and/or sentences that may be used when new summaries are generated to check for consistency and value of the summary sentences.

In this manner, the service provider's system for automated summary generation may expedite the generation of conversational dialogue summaries and other live chat session. Where these sessions are asynchronous, this allows for automated output of summaries to new users, which facilitates faster provision of chat services. The summaries may be generated quickly, without user input, and in more widely deployed chat services in different computing channels. Furthermore, a simplified interface may be provided to view, select, and interact with summaries and sentences from different channels without requiring coding translation and/or obtaining dialogue from different platforms. By reducing the coding input and manual generation, computing resources required for individual summary generation may be reduced.

FIG. 1 is a block diagram of a networked system 100 suitable for implementing the processes described herein, according to an embodiment. As shown, system 100 may comprise a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110, an agent device 120, and a service provider server 130 in communication over a network 150. Client device 110 may be utilized by a user, customer, or entity to access a computing service or resource provided by service provider server 130, where service provider server 130 may provide various data, operations, and other functions to client device 110 via network 150. In this regard, client device 110 may be used to engage in live chat services over a period of time, which may generate a dialogue for asynchronous chat sessions and/or communications. Thereafter, these dialogues may be summarized using a summarization engine and ML model of service provider server 130, which may be output to a live agent utilizing agent device 120.

Client device 110, agent device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with agent device 120 and/or service provider server 130. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute modules and associated devices of client device 110 to provide a convenient interface to permit a user for client device 110 to utilize services of service provider server 130, including live chat services and other communication services when requesting assistance or otherwise conversing with live agents and/or chatbots of service provider server 130. Where service provider server 130 may correspond to an online transaction processor, the computing services may include those to enter, view, and/or process transactions, onboard and/or use digital accounts, and the like with associated chat services. In this regard, application 112 may correspond to specialized hardware and/or software utilized by client device 110 that may provide transaction processing, such as through a user interface enabling the user to enter and/or view a transaction for processing. This may be based on a transaction generated by application 112 using a merchant website or by performing peer-to-peer transfers and payments. Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 130. Thus, application 112 may also correspond to different service applications and the like that are associated with service provider server 130.

In this regard, when requesting chat services, application 112 may process, display, and/or output chat 114, which may correspond to a chat session for a dialogue between the user associated with client device 110 and an agent or chatbot using agent device 120. Chat 114 may correspond to text, images, audiovisual content, voice, and the like, which may correspond to an asynchronous chat session for one or more asynchronous chat sessions for a dialogue. Service provider server 130 may collect chat 114 with other chats, communications, or conversations into a dialogue, and may process to generate a summary, as discussed herein. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website. However, in other embodiments, application 112 may include a dedicated software application of service provider server 130 or other entity (e.g., a merchant) resident on client device 110 (e.g., a mobile application on a mobile device) that is displayable by a graphical user interface (GUI) associated with application 112.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112, identifiers associated with hardware of client device 110, or other appropriate identifiers, such as identifiers used for payment/user/device authentication or identification, which may be communicated as identifying the user/client device 110 to service provider server 130. Moreover, database 116 may include information for chat sessions and/or user identification during chat sessions.

Client device 110 includes at least one network interface component 118 adapted to communicate with agent device 120 and/or service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Agent device 120 may be implemented as a communication device that may utilize appropriate hardware and software configured for wired and/or wireless communication with client device 110 and/or service provider server 130. For example, in one embodiment, agent device 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Agent device 120 of FIG. 1 contains a live chat application 122, a database 126, and a network interface component 128. Live chat application 122 may correspond to executable processes, procedures, and/or applications with associated hardware. In other embodiments, agent device 120 may include additional or different modules having specialized hardware and/or software as required.

Live chat application 122 may correspond to one or more processes to execute modules and associated devices of agent device 120 to provide a convenient interface to permit a user for agent device 120 (e.g., a live agent, although chatbots may also converse with client device 110) to utilize live services of service provider server 130 to communicate with the user of client device 110. Where service provider server 130 may correspond to an online transaction processor, the services provided to agent device 120 may correspond to CRM services and systems, such as those that provide assistance via live chat service with agents and/or chatbots. However, in further embodiments, different live chat services may be provided via live chat application 122, such as those associated with messaging, social networking, media posting or sharing, microblogging, data browsing and searching, online shopping, and other services available to users, customers, and the like of service provider server 130. Where live chat application 122 may also or instead be executed by an automation chatbot, live chat application 122 may correspond to a computing automation process or device that implements one or more chat workflows and skills for automated service assistance.

In this regard, when engaging in chats, conversations, and other dialogues with the user of client device 110, such as during chat 114 on client device 110, live chat application 122 may be used to request, receive, and/or display a chat summary 124 for a dialogue of one or more asynchronous chats when engaging in chat 114. Chat summary 124 may be generated by service provider server 130 when prior to chat 114 or when chat 114 is initiated using past dialogue for the user associated with client device 110, as discussed herein. Thereafter, chat summary 124 is output to the live agent of agent device 120 for use during chat 114, such as in a user interface, window, pop-up, or the like with or in association with chat 114. In various embodiments, live chat application 122 may correspond to a general browser application configured to retrieve, present, and communicate information over the Internet (e.g., utilize resources on the World Wide Web) or a private network. For example, live chat application 122 may provide a web browser, which may send and receive information over network 150, including retrieving website information, presenting the website information to the user, and/or communicating information to the web site. However, in other embodiments, live chat application 122 may include a dedicated software application of service provider server 130 or other entity (e.g., a merchant) resident on agent device 120 (e.g., a mobile application on a mobile device) that is displayable by a graphical user interface (GUI) associated with live chat application 122.

Agent device 120 may further include database 126 stored on a transitory and/or non-transitory memory of agent device 120, which may store various applications and data and be utilized during execution of various modules of agent device 120. Database 126 may include, for example, identifiers such as operating system registry entries, cookies associated with live chat application 122, identifiers associated with hardware of agent device 120, or other appropriate identifiers, such as identifiers used for payment/user/device authentication or identification, which may be communicated as identifying the user/agent device 120 to service provider server 130. Moreover, database 126 may include chat information for chat 114 and/or chat summary 124.

Agent device 120 includes at least one network interface component 128 adapted to communicate with client device 110 and/or service provider server 130. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide live chat services with live agents and automated chatbots in electronic communication channels. In this regard, service provider server 130 includes one or more processing applications which may be configured to interact with client device 110 to provide user interfaces for chat services on client device 110 and agent device 120, as well as facilitate those chat services between client device 110 and agent device 120. The chat services may be for CRM systems that provide assistance and customer services, such as for an online transaction processor corresponding to service provider server 130. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes a dialogue platform 140, service applications 132, a database 134, and a network interface component 136. Dialogue platform 140, service applications 132, and service applications 132 may correspond to executable processes, procedures, and/or applications with associated hardware. In other embodiments, service provider server 130 may include additional or different modules having specialized hardware and/or software as required.

Dialogue platform 140 may correspond to one or more processes to execute modules and associated specialized hardware of service provider server 130 to provide a platform to engage with one or more live agent and/or automated chatbot service options of service provider server 130. In this regard, dialogue platform 140 may correspond to specialized hardware and/or software used by service provider server 130 to allow for generating of summaries 148 for dialogues, such as a dialogue associated with chat 114 from client device 110. This may cause output of chat summary 124 on agent device 120 for review during chat 114, such as to view other past asynchronous chats, communications, or messages by a user associated with client device 110 and dialogue platform 140. In this regard, dialogue platform 140 may include chat application 142 and a chat summarization application 144. Chat applications 142 may correspond to one or more applications and/or electronic communication platforms that may allow customers and other end user of service provider server 130 to communicate with live agents and/or chatbots provided by service provider server 130. In this regard, chat applications 142 may be associated with a CRM system for customer relations and the like. Chat applications 142 may provide communication via an email channel, a digital alert channel, a text message channel, a push notification channel, an instant message channel, or other messaging platform.

Chat applications 142 may provide live chat services with live agents and chatbots such that a user, such as the user associated with client device 110, may communication over those chat services to receive real-time assistance and/or responses (or in some cases delayed assistance and responses, where not live chat, such as asynchronous or offline communication exchanges). These chat services may generate dialogues, where dialogues may correspond to one or more chat sessions. Since chat sessions may be asynchronous and may occur over a period of time (e.g., days, weeks, months, etc.), the chat sessions may be conducted with different live agents and/or chatbots on dialogue platform 140. In order to provide summaries for live agents to review past chat sessions in a dialogue and summarize the dialogue into most important or relevant sentences or word groups, chat summarization application 144 may be utilized. Chat summarization application 144 may execute ML models 146 to generate summaries 148 for dialogues between users and chat applications 142, which may include text from different chat sessions.

In various embodiments, chat summarization application 144 includes ML models 146 that may be used for intelligent decision-making and/or predictive outputs and services, such as during the course of providing chat summarization services for dialogues between end users, customers, entities, and the like with live agents and chatbots via dialogue platform 140. Thus, ML models 146 may provide a predictive output, such as a score, likelihood, probability, or decision, associated with keyword level selection, such as selection and identification of keywords in a dialogue, and those keywords corresponding ranking or score within the documents. ML models 146 may employ a combination of different ML model algorithms. Although unsupervised ML model algorithms are discussed herein, it is understood and supervised and custom trained ML models and corresponding algorithms may also be used.

For example, ML models 146 may include ML or neural network (NN) models trained for intelligent decision-making and/or predictive outputs (e.g., scoring, comparisons, predictions, decisions, classifications, and the like) for particular uses with computing services provided by service provider server 130. When generating ML model algorithms used to create ML models 146, data may be used to generate one or more classifiers that provide recommendations, predictions, or other outputs based on those classifications and an ML or NN model algorithm. ML models 146 may be unsupervised, and thus training and re-training or adjustment may not be required by service provider server 130. In this regard, service provider server 130 may implement one or more unsupervised ML model algorithms to generate ML models 146 that correspond to an ML model pipeline and/or unsupervised ML model for keyword level selection. The ML model pipeline and/or model(s) for keyword level selection may therefore include a combination of unsupervised ML model algorithms to properly select, extract, and/or determine keywords and keywords rankings in a document or corpus of documents, such as a dialogue generated between a user for client device 110 and one or more agents or chatbots using dialogue platform 140.

When initially configuring unsupervised ML model algorithms, data may be used to determine input features and utilize those features to generate decision trees or other decision-making architectures based on the input features. For example, ML models for ML models 146 may include one or more layers, including an input layer, a hidden layer, and an output layer having one or more nodes, however, different layers may also be utilized. As many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used for the ML model algorithms for ML models 146, for example, using feature or attribute extraction for input data.

Thereafter, the hidden layer may be generated with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML models 146 that provide an output, classification, prediction, or the like. Thus, when ML models 146 are used to perform a predictive analysis and output, the input may provide a corresponding output based on the classifications trained for ML models 146.

By providing input data when generating the ML model algorithms for ML models 146, the nodes in the hidden layer may be adjusted such that an optimal output (e.g., a classification) is produced in the output layer. By continuously providing different sets of data and penalizing ML models 146 when the output of ML models 146 is incorrect, the ML model algorithms for ML models 146 (and specifically, the representations of the nodes in the hidden layer) may be adjusted to improve its performance in data classification. This data classification may correspond selection and ranking of keywords. Using the ML model algorithms, ML models 146 may be created to perform intelligent decision-making and predictive outputs. This may include generation of summaries 148.

Summaries 148 may be generated by taking a dialogue corresponding to a document or corpus of documents having text from chat sessions, which may be asynchronous (although synchronous chat sessions with multiple agents may also occur). The dialogue may be time limited, such as to limit chat sessions occurring too far in the past that may be irrelevant, or may be limited by a particular subject matter, transaction identifier, issue, or the like. The dialogue may be filtered by chat summarization application 144 and pre-processed, such as to provide general text cleansing, filtering chatbot utterances and/or noise from chatbots or live agents (e.g., greetings, responsive salutations that do not add content, and the like).

Once pre-processed and filtered, chat summarization application 144 may execute ML models 146 with the dialogue to determine keywords and keyword rankings based on an unsupervised ML model pipeline for keyword level selection. ML models 146 may include a RAKE ML model algorithm to identify particular keywords and a TF-IDF model algorithm to ranking, sort, or score keywords by their particular occurrence within documents, chat sessions, or other text making up the dialogue. ML models 146 may further include a TextRank model algorithm to rank sentences according to keywords and noun phrase extraction to determine keyword rankings, scores, or other values for the keywords that have be selected and identified in the sentences.

After executing ML models 146, chat summarization application 144 may further include a scoring operation and a post-processing and further filtering operation. During the scoring operation, chat summarization application 144 may score individual sentences using the number of keywords found in each sentence. In various embodiments, the scoring operation may also consider the rank of each keyword in the sentences. When scoring the sentences, further processing may be performed to remove live agent and/or chatbot messages so that they are not, or only a portion are, considered in the sentence rankings. Chat summarization application 144 may sort the sentences in descending order and select N number of highest scored sentences for summaries 148. N may be tunable and/or may be automatically selected based on a length of the corresponding dialogue or number of asynchronous chat sessions.

An entailment filter may be applied by chat summarization application 144 to filter certain sentences and/or summaries based on an entailment score. Further, post-processing by chat summarization application 144 may apply parts-of-speech tags and/or NER for named entities to the scored sentences and/or selected sentences for summaries 148. Chat summarization application 144 may then generate summaries 148 using this combination of unsupervised ML models and processing operations. Summaries 148 may list the sentences in descending order based on timestamp (e.g., oldest to newest or vice versa) and/or based on score. Further, each sentence may be shown with a corresponding score from chat summarization application 144. Once generated, summaries 148 may be output to one or more live agents. For example, a live agent utilizing agent device 120 may view chat summary 124 in live chat application 122 when interacting with a user via client device 110, such as during chat 114. Thus, chat summary 124 from summaries 148 may correspond to a summary of past dialogue that is associated with chat 114 and may provide a summary of past conversations the user of client device 110 has had with agents and chatbots of service provider server 130. This allows the live agent viewing chat summary 124 to quickly become familiar with the issues and information required to provide service during chat 114. Further, the live agent may interact with chat summary 124 to provide feedback, such as by re-ranking sentences, noting sentences as important or unimportant, and/or requesting additional summary sentences.

Service applications 132 may correspond to one or more processes to execute modules and associated specialized hardware of service provider server 130 to process a transaction or provide another service to customers or end users of service provider server 130, which may have live chat services and assistance channels provided by dialogue platform 140. In some embodiments, service applications 132 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. The payment account may be accessed and/or used through a browser application and/or dedicated payment application executed by client device 110 and engage in transaction processing through service applications 132. Service applications 132 may process the payment and may provide a transaction history to client device 110 for transaction authorization, approval, or denial. However, in other embodiments, service applications 132 may instead provide different computing services, including social networking, microblogging, media sharing, messaging, business and consumer platforms, etc. Thus, the live service assistance options provided for the services of service applications 132 may include other assistance provided through electronic communication channels.

Service applications 132 as may provide additional features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including one or more GUIs and the like, configured to provide an interface to the user when accessing service provider server 130, where the user or other users may interact with the GUI to more easily view and communicate information. In various embodiments, service applications 132 may include additional connection and/or communication applications, which may be utilized to communicate information to over network 150.

Additionally, service provider server 130 includes database 134. Database 134 may store various identifiers associated with client device 110. Database 134 may also store account data, including payment instruments and authentication credentials, as well as transaction processing histories and data for processed transactions. Database 134 may store financial information and tokenization data, as well as transactions, transaction results, and other data generated and stored by service applications 132. Further, database 134 may include dialogues and other chat data, including text, images, audiovisual content, and the like from chat sessions.

In this regard, different text from asynchronous chat sessions may be collected into a dialogue, which may be stored by database 134.

In various embodiments, service provider server 130 includes at least one network interface component 136 adapted to communicate with client device 110 and/or agent device 120 directly and/or over network 150. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2 is an exemplary user interface 200 displaying a summary of a chat dialogue from a live chat service based on keyword extraction and sentence scoring using unsupervised machine learning models, according to an embodiment. User interface 200 of FIG. 2 includes information displayed by agent device 120 from system 100 of FIG. 1, in a chat summary window 202 when accessing a live chat service and application. Agent device 120 may therefore be used to access one of chat applications 142 provided by dialogue platform 140 of service provider server 130 in system 100.

User interface 200 may correspond to an application interface, webpage interface, or the like that allows agents or other users associated with a service provider to request and/or view chat summary window 202 before or during a chat session or other communications with a user. Chat summary window 202 may correspond to all or a portion of user interface 200 or may be displayed with other components and data of user interface 200. Chat summary window 202 includes a summary 204 of a dialogue between a customer or other user of the service provider and a live chat system provided by the service provider. Further, chat summary window 202 includes details 206 for specifically selected important or relevant details from summary 204 of the dialogue. In this regard, the dialogue may correspond to one or more individual chat sessions that generated text by the customer with the live chat service using a live agent and/or chatbot. The dialogue therefore includes one or more documents or text chains, which may further include individual sentences or groups of words.

Summary 204 includes a collection of selected sentences from the dialogue with the customer or other user. Summary 204 may be generated by one or more unsupervised ML models, as well as a summarizer, such as chat summarization application 144 in system 100. Summary 204 includes selected sentences 208a, 208b, 208c, 208d, and 208e. Each of selected sentences 208a-208e has corresponding text taken from the sentence or other group of words for selected sentences 208a-208e. Further, selected sentences 208a-208e are ranked or ordered in terms of relevancy. For example, selected sentence 208a is shown with a "most relevant" icon or badge, which designates selected sentence 208a as most relevant to summary 204. This may be based on scores or rankings for selected sentences 208a-208e or may be based on timestamps. For example, selected sentence 208a is also shown with a most recent timestamp, and therefore may be considered most relevant due to the timestamp of selected sentence 208a. However, in other embodiments, the text "The advisory told me that after days the funds would be released so why aren't they" may be considered as most relevant to the issue (e.g., based on keyword amount and/or ranking, as well as intelligently selected based on a query by the corresponding customer).

An agent may further interact with chat summary window 202 in order to view additional information in summary 204 and/or details 206. For example, in summary 204, feedback options 210a, 210b, 210c, 210d, and 210e may be used to provide feedback on the accuracy of selected sentences 208a-208e on providing relevant or useful information in summary 204. Selection of a "yes" for one or more of feedback options 210a-210e may cause the corresponding one of selected sentences 208a-208e to remain in summary 204 and/or change position, such as being ranked higher. However, selection of a "no" may cause the corresponding one of selected sentences 208a-208e to be removed from summary 204, re-ranked lower, and/or cause another scored sentence (e.g., the sixth highest scored sentence, where 5 are currently shown in user interface 200) to be populated in chat summary window 202.

Details 206 allow further interaction and information to be displayed to the agent viewing user interface 200 to interact with chat summary window 202. Under details 206, a transaction ID 212, money amounts 214, dates 216, tracking numbers 218, a dispute ID 220, and a details feedback option 222 are shown as selectable options or interactive interface elements. Selection of one may display the corresponding information and/or allow for retrieval of the information. The agent may also copy the data for use with a corresponding live chat session and/or another application for service assistance. Transaction ID 212, money amounts 214, dates 216, tracking numbers 218, and dispute ID 220 may be pulled from the corresponding dialogue using NER of a natural language processor or another text identification and data extraction process. Additionally, details feedback option 222 allows for feedback to determine if the data in details 206 is correct or should be refreshed and/or loaded with other data.

Figure 3B:
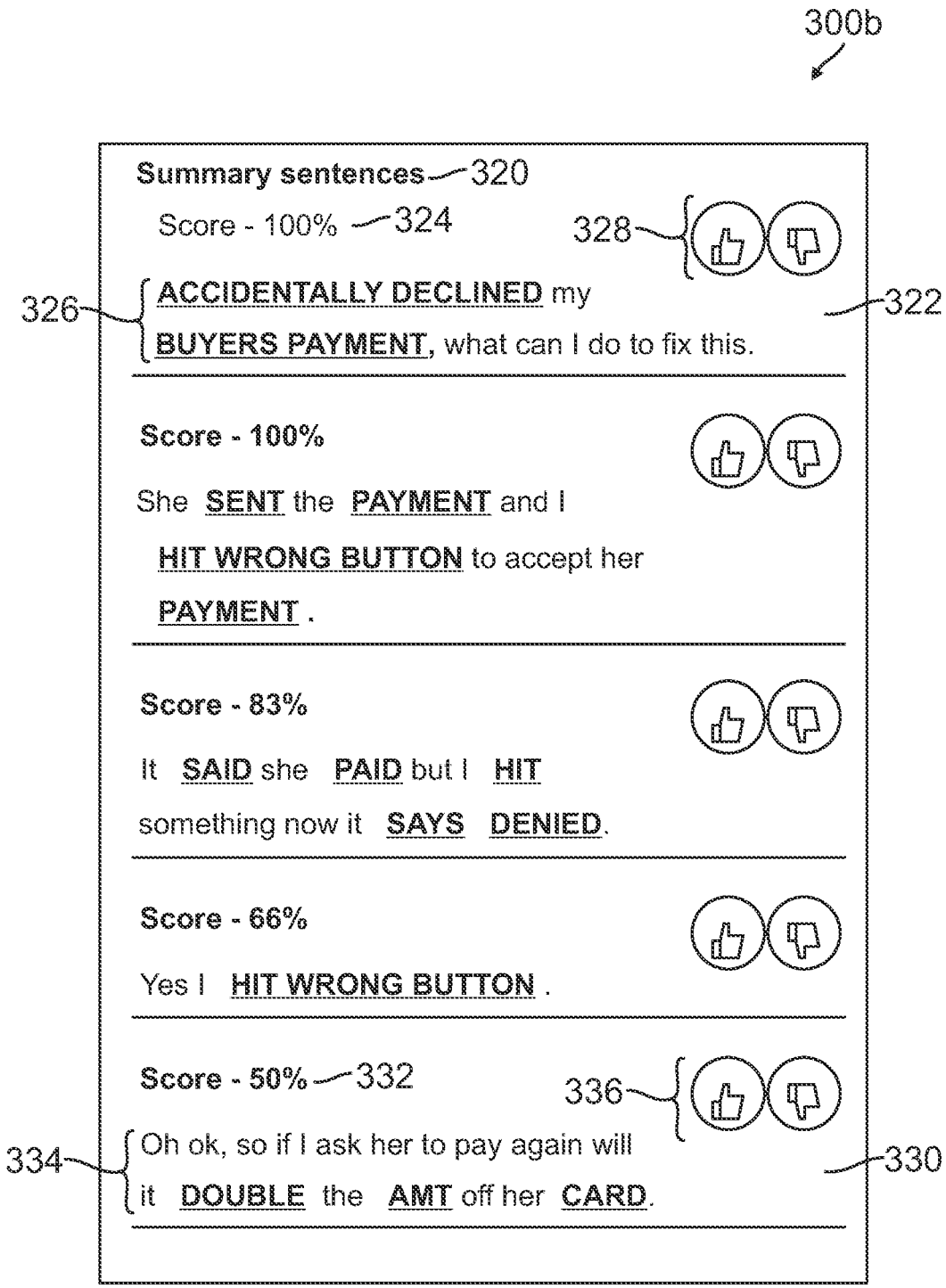

FIGS. 3A and 3B are exemplary diagrams 300a and 300b of a chat dialogue having extracted keywords using unsupervised machine learning models that are used to determine a summary of the chat dialogue, according to an embodiment. Diagrams 300a and 300b may include data processed by service provider server 130 discussed in reference to system 100 of FIG. 1. In this regard, service provider server 130 may utilize the data of a dialogue in diagram 300a to present a summary in diagram 300b.

In diagram 300a, a conversation A 302 is shown with conversation text 304. Conversation text 304 includes different lines of text from a conversation or chat between a customer and an agent for a live chat service, such as one provided by a CRM system or platform of a service provider. In this regard, conversation text 304 includes sentences or other groups of words that make up the lines and the conversation between the customer and the agent. Similarly, conversation B 306 includes conversation text 308 having similar lines of text that make up the sentences and/or groups of words exchanged between the customer and the live agent. Conversation A 302 may correspond to a first chat session that the customer has with an agent, where conversation B 306 may be the second chat session. As such, conversation A 302 and conversation B 306 may correspond to asynchronous chat sessions that are conducted at different times and/or with different agents. Thus, using the processes and components discussed herein, the agent conducting conversation B 306 may receive a summary of conversation A 302 and a further agent may receive a summary of both conversation A 302 and conversation B 306. These summaries may be based on keyword level selection and sentence scoring using one or more unsupervised ML models, as discussed herein.

When performing keyword level selection and sentence scoring, keyword generation 310 is required to be performed in order to determine keywords 312 selected from conversation texts 304 and 308. During keyword generation 310, keywords 312 may be determined and selected using one or more unsupervised ML models, such as a ML model pipeline executed by a summarizer. The summarizer may further utilize pre-processing, post-processing, and filtering steps to prepare conversation texts 304 and 308, as well as prepare output from the ML models for sentence scoring and summary generation. Keyword generation 310 may correspond to a sub-process prior to the display of summary sentences 320 shown in diagram 300b of FIG. 3B. In this regard, keywords 312 may not be visible to an agent, but instead may be processed by the summarizer and utilized for sentence scoring, ranking, and output of summary sentences 320. However, in other embodiments, keywords 312 may be visible and/or may be selectable by an agent, for example, to interact with and/or view keywords 312 in conversation texts 304 and 308. Further, one or more data scientists developing and/or tuning the summarizer and/or unsupervised ML models may also utilize keywords 312 from keyword generation 310 in the processes of deploying and/or updating the summarizer.

Diagram 300b demonstrates a use of keywords 312 to generate summary sentences 320. Summary sentences 320 are shown with five selected sentences from scoring of those sentences using keywords 312 including keywork rankings for keywords 312. Summary sentences 320 may include more or less sentences as needed by an agent and/or based on an amount of content for the underlying dialogue (e.g., conversation A 302 and conversation B 306). In diagram 300b, summary sentences 320 further show scores for each sentence, text for each sentence, and a feedback option to provide feedback for each sentence. Thus, summary sentences 320 allow for viewing of keywords within text and why a sentence was selected for summary sentences 320, as well as adjust summary sentences 320 as needed.

For example, a first sentence 322 displayed has a score 324 of 100% noting that first sentence 322 is the highest scored sentence and/or more relevant based on keywords 312. In sentence text 326 for the first sentence 322, two keywords from keywords 312 can be seen "accidentally declined" and "buyers payment". These keywords may cause first sentence 322 to be scored the highest. In this regard, the two keywords in first sentence 322 may have the highest ranking or scoring within conversation A 302, conversation B 306, and/or keywords 312. Further, a feedback option 328 is provided to determine whether first sentence 322 is relevant or is required to be hidden, removed, or rescored.

Summary sentences 320 further include a last sentence 330 that has a score 332 of 50% based on the keywords found in sentence text 326. Three of keywords 312 are found in sentence text 326, "double", "amt" (amount), and "card". However, these keywords may be considered less relevant and therefore not have as high a ranking in keywords 312. Thus, score 332 may reflect that the score for last sentence 330 is not as relevant for summary sentences 320. In this regard, a feedback option 336 may be provided in cases that score 332 is not correct. For example, using feedback option 336, last sentence 330 may be moved up in summary sentences 320 or removed from summary sentences 320.

Figure 4:
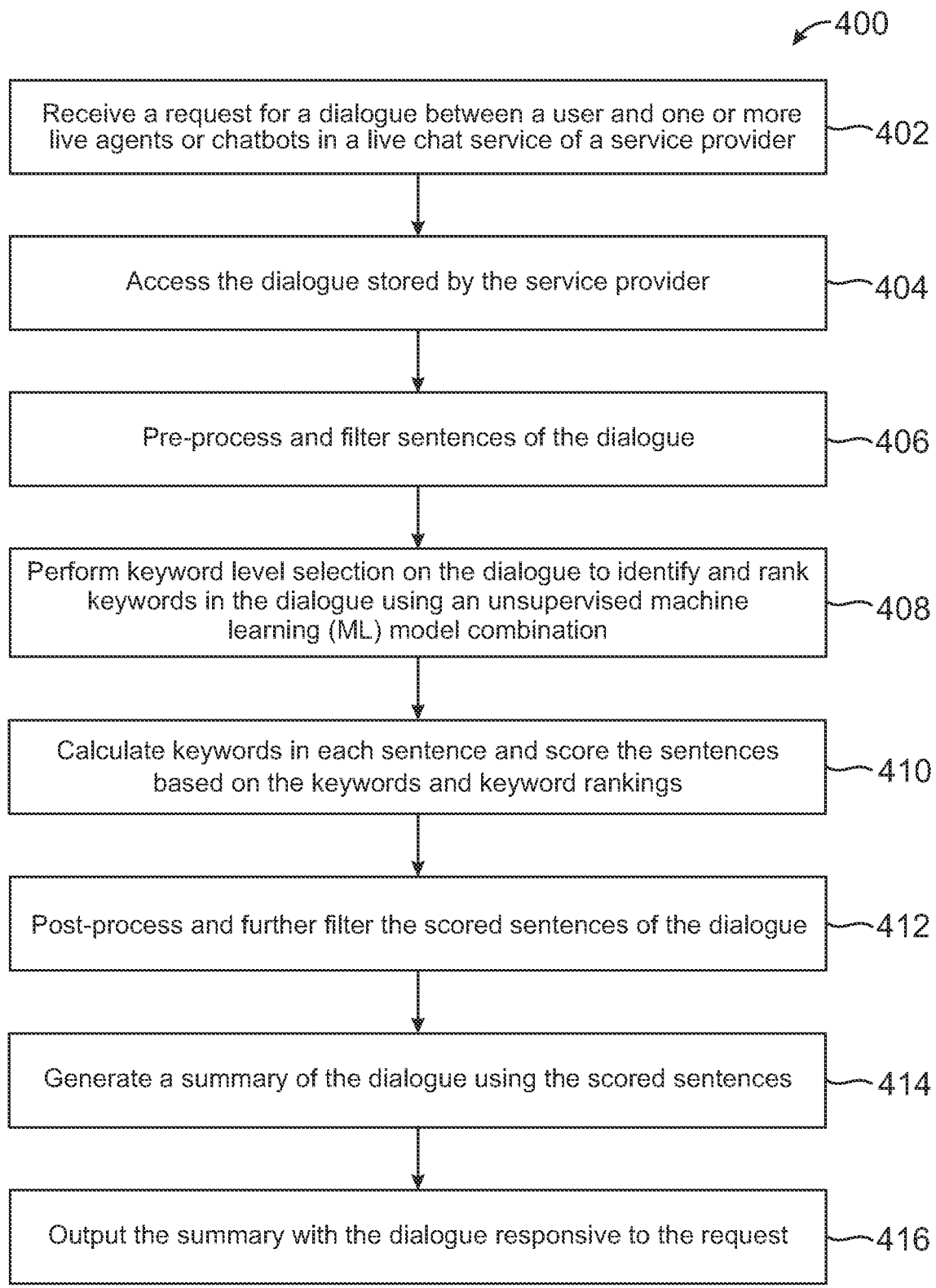
FIG. 4 is a flowchart for sentence level dialogue summaries using unsupervised machine learning for keyword selection and scoring, according to an embodiment.

FIG. 4 is a flowchart 400 for sentence level dialogue summaries using unsupervised machine learning for keyword selection and scoring, according to an embodiment. Note that one or more steps, processes, and methods described herein of flowchart 400 may be omitted, performed in a different sequence, or combined as desired or appropriate.

At step 402 of flowchart 400, a request for a dialogue between a user and one or more live agents or chatbots in a live chat service of a service provider is received. The dialogue may correspond to one or more documents including text having a plurality of sentences or groups of words (e.g., phrases or sections of sentences). The dialogue may correspond to a chat, conversation, exchange of messages, or the like that may be different asynchronous chats over a period of time. However, the period of time may be limited to a certain specific time period or past amount of time. The dialogue may be collected in a single document or a corpus of documents for processing. At step 404, the dialogue stored by the service provider is accessed, for example, by a chat summarization application and/or operation associated with a live chat service and platform. The dialogue may be accessed in response to a request and/or based on detecting that the user is initiating or involved with another chat session with another live agent via the live chat service.

At step 406, sentences in the dialogue are pre-processed and filtered. The pre-processing may correspond to general text cleansing and the like that allows for artifacts, typos, and other errors in grammar or syntax to be resolved so that proper processing of the text from the dialogue may be accomplished. The filtering may be executed to remove sentences and word groupings that are unnecessary, irrelevant, or provided little to no value in the overall dialogue. The filtering may therefore be used to remove sentences that may otherwise cause inconsistent or incorrect results or add no additional information. At step 408, keyword level selection is performed on the dialogue to identify and rank keywords in the dialogue using an unsupervised ML model combination. The keyword level selection may execute a pipeline of unsupervised ML model algorithms to identify keywords and rank the keywords for importance or relevance in the dialogue. The keyword level selection may be performed by the unsupervised ML model combination by utilizing a RAKE algorithm, a TF-IDF algorithm, a TextRank algorithm, and a noun phrase extraction algorithm. Using the unsupervised ML models, an output of keywords and keyword ranks may be provided to a summarizer for generating a summary of the dialogue.

At step 410, keywords in each sentence are calculated and identified, and the sentences are scored based on the keywords and keyword rankings. A number of keywords in each sentence may be identified and each keyword may be provided a value based on their keyword rankings. Using the number of keywords and their corresponding values, each sentence may then be scored for their overall relevance or importance in the dialogue. The score may represent how relevant each sentence is and may further be affected by a past timestamp of the sentences. At step 412, the scored sentences of the dialogue are post-processed and filtered. Post-processing may further add specific tags to the sentences, such as those associated with named entities using NER and/or those for selected keywords. Further filtering may include filtering out false negatives by omitting from summaries those that have entailment scores under a threshold and/or cutting out messages by live agents and/or chatbots.

At step 414, a summary of the dialogue using the scored sentences is generated. The summary may select N number of highest scored sentences based on system configuration and/or length of the dialogue. The summary may then list the selected sentences in order by timeline or chronology, or may instead list by score. Any additional tags in the sentences may also be provided to the sentences in the summary. At step 416, the summary is output with the dialogue responsive to the request for the dialogue. For example, the summary may be output on an agent's device as the agent is reviewing the dialogue, connecting with the user, and/or conversing with the user. In a user interface displaying the summary, the agent may also be provided options to provide feedback for the summary and select named entities in order to view additional data regarding the information in the selected sentences for the dialogue's summary.

Figure 5:
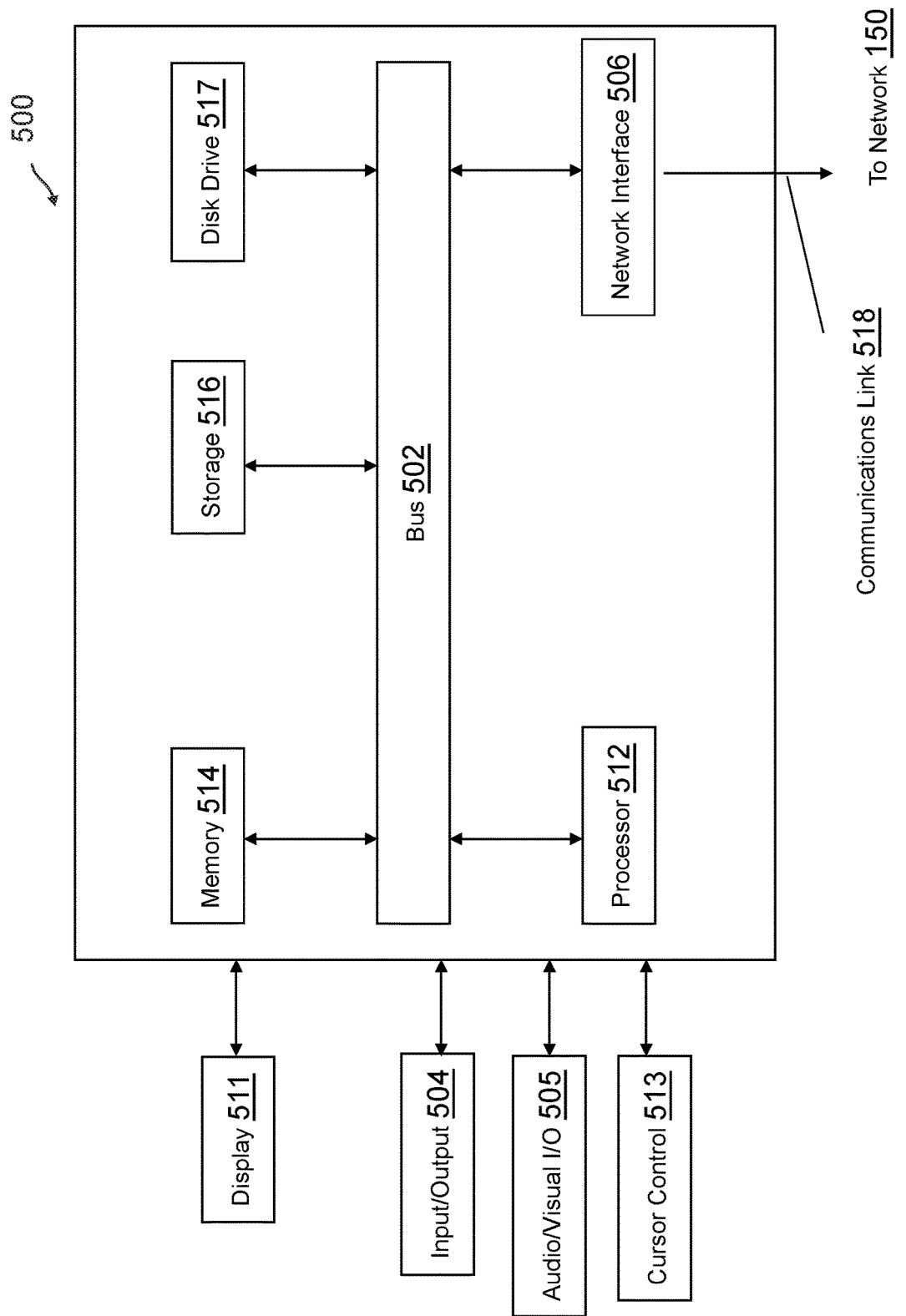
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a dialogue between a user and a live chat service of a service provider associated with the system, wherein the dialogue comprises one or more asynchronous chat sessions between the user and the live chat service, and wherein the one or more asynchronous chat sessions comprise a plurality of sentences;
processing the dialogue using a machine learning (ML) model pipeline comprising a plurality of ML models, wherein the processing comprises:
performing a keyword level selection for the dialogue using the plurality of sentences and a first one of the plurality of ML models a machine learning (ML) model, and
determining a plurality of keywords in the plurality of sentences and a corresponding ranking of each of the plurality of keywords using a second one of the plurality of ML models and based on the keyword level selection;
calculating, by the ML model pipeline, scores for the plurality of sentences based on a number of appearances of the plurality of keywords in the plurality of sentences and the corresponding ranking for each of the plurality of keywords;
computing modifications to the scores based on a particular agent and feedback by the particular agent from sentence summarizations of previous dialogues; and
outputting a subset of the plurality of sentences based on the scores and the modifications.

2. The system of claim 1, wherein the ML model pipeline is an unsupervised ML model pipeline and comprises a combination of unsupervised ML model techniques enabling the keyword level selection, and wherein the combination of the unsupervised ML model techniques comprises at least one of a Rapid Automatic Keywords Extraction (RAKE) technique, a term frequency-inverse document frequency technique, a Text Rank technique, or a noun phrase extraction technique.

3. The system of claim 1, wherein the calculating, by the ML model pipeline, the scores for the plurality of sentences comprises:
identifying the plurality of keywords in each of the plurality of sentences;
calculating the number of the appearances of the plurality of keywords and a combined score of the number of the appearances of the plurality of keywords in the plurality of sentences using the identifying and the corresponding ranking for each of the plurality of keywords; and
sorting the plurality of sentences in a descending order based on the calculating the number of appearances.

4. The system of claim 3, wherein the outputting the subset of the plurality of sentences comprises:
obtaining the subset of the plurality of sorted sentences based on a number of highest scored sentences from the plurality of sorted sentences in the descending order;
generating a summary of the conversational dialogue from the obtained subset of the plurality of sorted sentences; and
outputting the summary of the conversational dialogue with the live chat service.

5. The system of claim 4, wherein the number of the highest scored sentences comprise a preselected threshold of the highest scored sentences, and wherein the number is adjustable based on one of input from an administrator for the live chat service or a length of the conversational dialogue.

6. The system of claim 1, wherein prior to the performing the keyword level selection, the operations further comprise:
performing pre-processing on text from the conversational dialogue using a pre-processing operation.

7. The system of claim 5, wherein prior to the calculating, by the ML model pipeline, the scores for the plurality of sentences, the operations further comprise:
applying an entailment filter and post-processing to the plurality of keywords in the plurality of sentences.

8. The system of claim 1, wherein prior to the performing the keyword level selection, the operations further comprise:
filtering chatbot utterances from the conversational dialogue.

9. The system of claim 1, wherein the conversational dialogue comprises text between the user and one or more live agents or chatbots for the live chat service.

10. A method comprising:
receiving, from an assistance chat service of a service provider, a chat dialogue comprising a plurality of word groupings from one or more asynchronous chat sessions between a user and the assistance chat service;
filtering the plurality of word groupings, wherein the filtering comprises cleaning text of the plurality of word groupings and removing one or more of the plurality of word groupings below a value threshold;
generating a plurality of keywords using a first one of a plurality of ML keyword extraction models of an unsupervised ML model pipeline;
determining a plurality of keyword rankings for the plurality of keywords using the filtered plurality of word groupings and a second one of the plurality of ML keyword extraction models;
scoring the filtered plurality of word groupings using the plurality of keywords, the plurality of keyword rankings, and the unsupervised ML model pipeline;
computing, using the unsupervised ML model pipeline, modifications to the scoring based on a particular agent and feedback by the particular agent from summaries of previous chat dialogues;
generating a summary of the chat dialogue based on the scoring, wherein the summary comprises a subset of the plurality of word groupings meeting or exceeding a threshold score based on the scoring; and
outputting the summary to one or more live agents of the service provider.

11. The method of claim 10, wherein prior to the generating the summary, the method further comprises:
filtering false negative sentences from the scored plurality of word groupings;
tagging one or more parts of speech from the scored plurality of word groupings; and
applying named entity recognition in the scored plurality of word groupings.

12. The method of claim 10, wherein the summary comprises the subset of the plurality of word groupings sorted in a descending order based on a first number of highest scored word groupings from the scored plurality of word groupings.

13. The method of claim 12, wherein the first number of the highest scored sentences is tunable to one or more second number of the highest scored sentences.

14. The method of claim 10, further comprising:
receiving additional feedback from the one or more live agents viewing the summary, wherein the received additional feedback identifies at least one of a positive scoring of one of the plurality of word groupings in the summary or a negative scoring of another one of the plurality of word groupings in the summary; and
re-ranking the plurality of word groupings in the summary based on the scoring and the received additional feedback.

15. The method of claim 10, wherein the plurality of word groupings in the chat dialogue are limited to a past length of time for the chat dialogue with the assistance chat service.

16. The method of claim 10, wherein the plurality of ML keyword extraction models for the unsupervised ML model pipeline comprise at least one of a Rapid Automatic Keywords Extraction (RAKE) ML model, a term frequency-inverse document frequency ML model, a Text Rank ML model, or a noun phrase extraction ML model.

17. A non-transitory machine-readable medium having stored thereon machine-readable instructions executable to cause a machine to perform operations comprising:
accessing, for a plurality of chat dialogues from a live chat assistance platform of a service provider, a pre-processor configured to perform text filtering of the plurality of chat dialogues, wherein each of the plurality of chat dialogues comprises a plurality of sentences;
generating, for the plurality of chat dialogues, a keyword summarizer configured to perform keyword generation and keyword ranking for a plurality of keywords in the plurality of sentences, wherein the keyword summarizer comprises a combination of machine learning (ML) models, and wherein the keyword summarizer is further configured to output summaries for the plurality of chat dialogues based on scores computed for the plurality of sentences used for the summaries;
computing, using the combination of ML models, modifications to the scores for the plurality of sentences that adjust the summaries based on a particular agent and feedback by the particular agent from sentence summarizations of previous dialogues;
accessing, for the summaries and the modifications, an entailment filter configured to filter false negative sentences from the summaries that have an entailment score below a threshold; and
accessing, for the summaries, a post-processor configured to perform at least one of part-of-speech tagging or named entity recognition tagging of words and phrases in the summaries.

18. The non-transitory machine-readable medium of claim 17, wherein the operations further comprise:
combining, for a chat dialogue summary system, the pre-processor, the keyword summarizer, the entailment filter, and the post-processor.

19. The non-transitory machine-readable medium of claim 18, wherein the operations further comprise:
after the combining, implementing the chat dialogue summary system with the live chat assistance platform for uses with live agents of the live chat assistance platform, wherein the live chat assistance platform performs asynchronous live chats handled by two or more of the live agents or chatbots on the live chat assistance platform.

20. The non-transitory machine-readable medium of claim 17, wherein the combination of the ML models comprises at least one of a Rapid Automatic Keywords Extraction (RAKE) technique, a term frequency-inverse document frequency technique, a Text Rank technique, or a noun phrase extraction technique.

* * * * *